United States Patent
Tanaka et al.

(10) Patent No.: US 7,515,154 B2
(45) Date of Patent: Apr. 7, 2009

(54) LAYOUT ELEMENT ARRANGING DEVICE, LAYOUT ELEMENT ARRANGING METHOD, LAYOUT ELEMENT ARRANGING PROGRAM, COMPUTER READABLE RECORDING MEDIUM, AND ELECTRONIC APPARATUS

(75) Inventors: Toshio Tanaka, Shiojiri (JP); Shinji Miwa, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 626 days.

(21) Appl. No.: 11/019,393

(22) Filed: Dec. 23, 2004

(65) Prior Publication Data
US 2005/0146526 A1    Jul. 7, 2005

(30) Foreign Application Priority Data
Dec. 24, 2003 (JP) ............................. 2003-427074
Sep. 22, 2004 (JP) ............................. 2004-274614

(51) Int. Cl.
*G06T 13/00*    (2006.01)
*G06T 15/70*    (2006.01)
(52) U.S. Cl. ..................................... 345/473; 345/440
(58) Field of Classification Search ................ 345/474, 345/683, 442, 440, 441, 473
See application file for complete search history.

(56) References Cited

U.S. PATENT DOCUMENTS

| | | | | |
|---|---|---|---|---|
| 4,752,836 A | * | 6/1988 | Blanton et al. ................. 386/84 |
| 4,841,291 A | * | 6/1989 | Swix et al. ................... 345/473 |
| 5,596,693 A | * | 1/1997 | Needle et al. ................ 345/474 |
| 5,831,632 A | | 11/1998 | Schuster et al. |
| 6,310,622 B1 | | 10/2001 | Asente |
| 6,522,328 B1 | | 2/2003 | Asente |
| 6,784,886 B1 | * | 8/2004 | Cailloux ..................... 345/440 |
| 2002/0126121 A1 | * | 9/2002 | Robbins ..................... 345/440 |

* cited by examiner

*Primary Examiner*—M Good Johnson
(74) *Attorney, Agent, or Firm*—Oliff & Berridge, PLC

(57) ABSTRACT

A layout element arranging device for arranging a predetermined number of layout elements having directions, which are sequentially arranged, on a plurality of paths having a plurality of arrangement points having directions, allows for a feeling of being, liveliness and truthfulness. The layout element arranging device has a first selection circuit for selecting a predetermined number of arrangement points from the plurality of arrangement points of each of the paths, based on the directions of the plurality of layout elements and the directions of the plurality of arrangement points for each of the paths, and a second selection circuit for selecting a predetermined number of paths from the plurality of paths, based on information concerning directions of the predetermined number of layout elements and the directions of the predetermined number of arrangement points for each of the paths selected by the first selection circuit.

34 Claims, 13 Drawing Sheets

| PATH | | ARRANGEMENT POINT | | | | | LINE SEGMENT | |
|---|---|---|---|---|---|---|---|---|
| PATH NUMBER | PATH SHAPE | THE NUMBER OF ARRANGEMENT POINTS | THE LEAST REQUIRED NUMBER OF IMAGES | ARRANGEMENT POINT NUMBER | COORDINATE | DIRECTION OF ARRANGEMENT POINT | LINE SEGMENT NUMBER | LINE SEGMENT FUNCTION |
| P1 | 22a 22b 22c 22g 22d 22f 22e | 7 | 4 | 22a | (50, 30) | 0 | 22a-22b | Y=F1(X) |
| | | | | 22b | (120, 30) | 345 | 22b-22c | Y=F2(X) |
| | | | | 22c | (180, 60) | 315 | | |
| | | | | 22d | (190,100) | 270 | | |
| | | | | 22e | (150,180) | 195 | | |
| | | | | 22f | (100,180) | 180 | | |
| | | | | 22g | (30,190) | 180 | | |
| P2 | | 4 | 2 | | | | | |
| P3 | | 9 | 4 | | | | | |
| P4 | | | | | | | | |
| P5 | | | | | | | | |
| P6 | | | | | | | | |

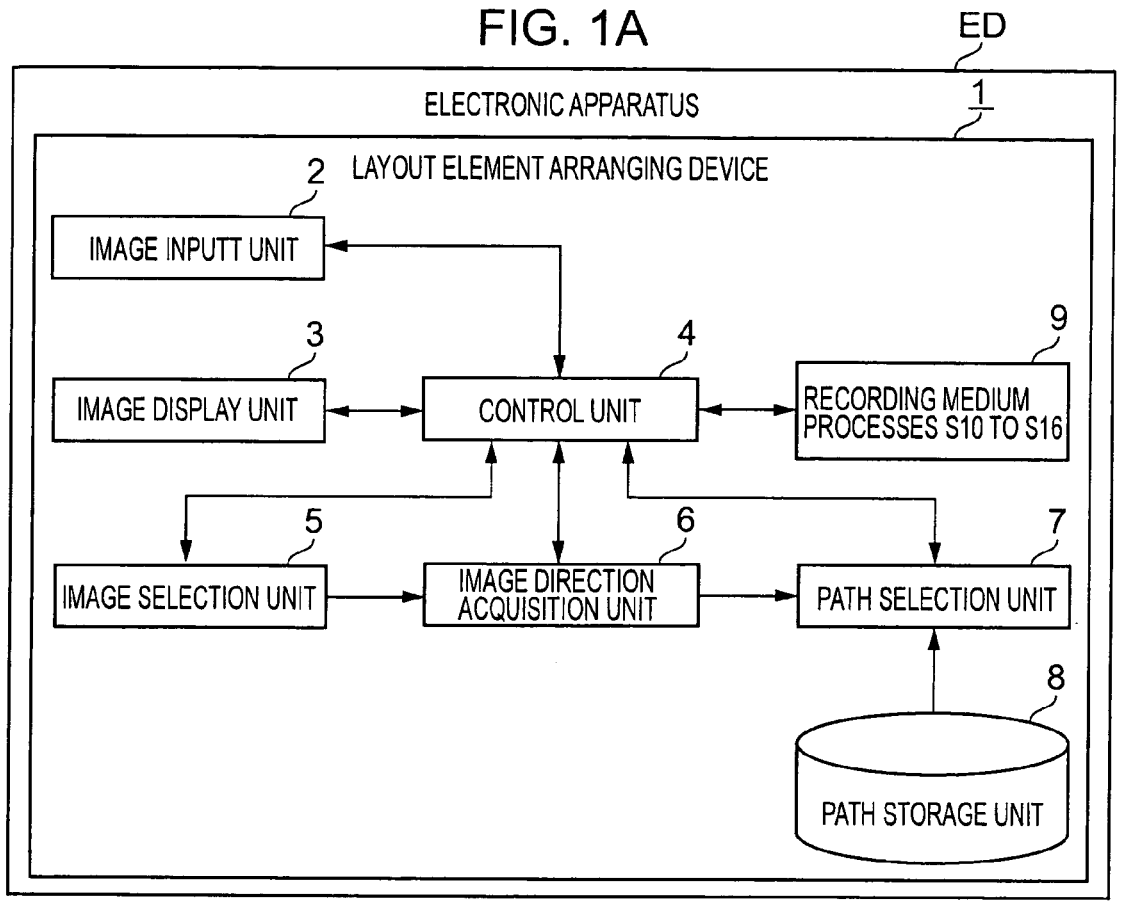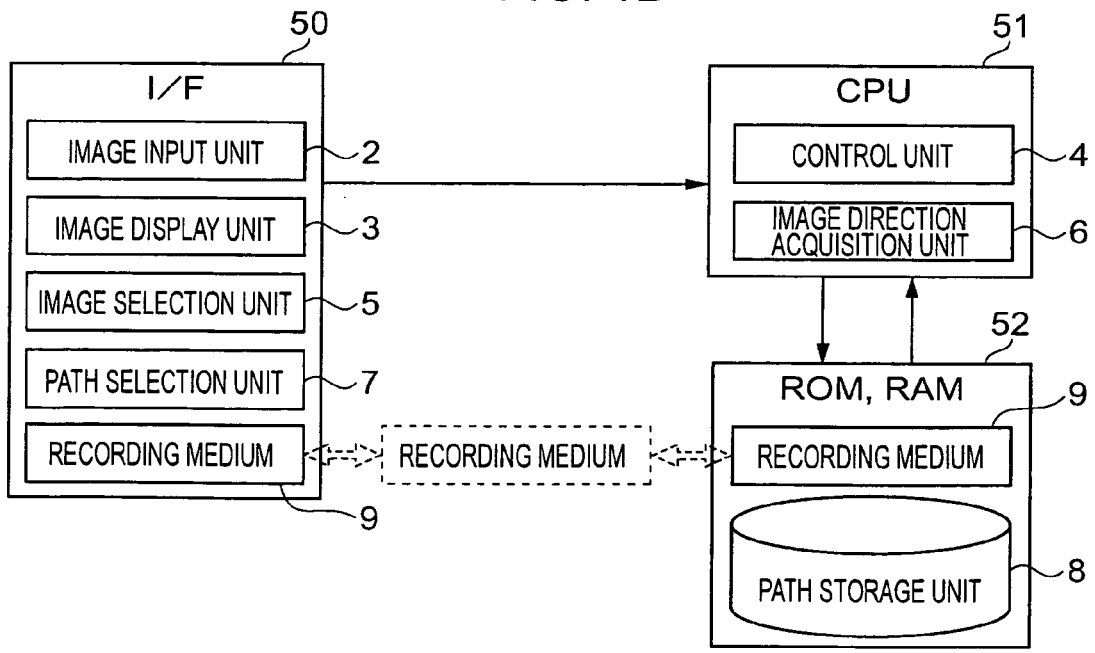

FIG. 7
| IMAGE | | IMAGE DIRECTION | |
| --- | --- | --- | --- |
| | | DIRECTION | ANGLE (DEGREE) |
| 30a | 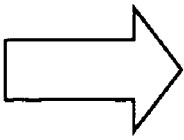 | → RIGHT | 0 |
| 30b | 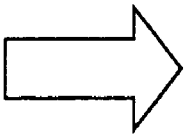 | → RIGHT | 0 |
| 30e | 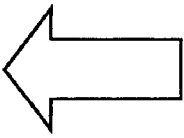 | ← LEFT | 180 |
| 30f | 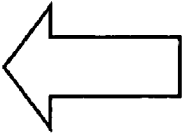 | ← LEFT | 180 |

FIG. 9

| PATH P1 | IMAGE/ANGLE | | | | | TOTAL ANGULAR VARIATION (DEGREE) |
|---|---|---|---|---|---|---|
| | 30a/0 | 30b/0 | 30e/180 | 30f/180 | | |
| ARRANGEMENT POINT/ ANGLE/ ANGULAR VARIATION | 22a/0/0 | 22b/345/15 | 22c/315/135 | 22d/270/90 | | 240 |
| | 22a/0/0 | 22b/345/15 | 22c/315/135 | 22e/195/15 | | 165 |
| | 22a/0/0 | 22b/345/15 | 22c/315/135 | 22f/180/0 | | 150 |
| | 22a/0/0 | 22b/345/15 | | 22g/180/0 | | 15 |
| | 22c/315/45 | 22d/270/90 | 22e/195/15 | 22g/180/0 | | 180 |
| | 22c/315/45 | 22d/270/90 | 22f/180/0 | 22g/180/0 | | 150 |
| | 22c/315/45 | 22e/195/150 | 22f/180/0 | 22g/180/0 | | 150 |
| | 22d/270/90 | 22e/195/150 | 22f/180/0 | 22g/180/0 | | 255 |

FIG. 10

| PATH P1 | | IMAGE/ANGLE | | | | | MAXIMUM ANGULAR VARIATION (DEGREE) |
|---|---|---|---|---|---|---|---|
| | 30a/0 | 30b/0 | 30e/180 | 30f/180 | | | |
| | 22a/0/0 | 22b/345/15 | 22c/315/135 | 22d/270/90 | | | 135 |
| | 22a/0/0 | 22b/345/15 | 22c/315/135 | 22e/195/15 | | | 135 |
| | 22a/0/0 | 22b/345/15 | 22c/315/135 | 22f/180/0 | | | 135 |
| ARRANGEMENT POINT/ ANGLE/ ANGULAR VARIATION | 22a/0/0 | 22b/345/15 | 22f/180/0 | 22g/180/0 | | | 15 |
| | 22c/315/45 | 22d/270/90 | 22e/195/15 | 22g/180/0 | | | 90 |
| | 22c/315/45 | 22d/270/90 | 22f/180/0 | 22g/180/0 | | | 90 |
| | 22c/315/45 | 22e/195/150 | 22f/180/0 | 22g/180/0 | | | 150 |
| | 22d/270/90 | 22e/195/150 | 22f/180/0 | 22g/180/0 | | | 150 |

FIG. 11

| PATH P1 | IMAGE/ANGLE | | | | THE NUMBER OF IMAGES HAVING ANGULAR VARIATION OF 45 DEGREES OR LESS |
|---|---|---|---|---|---|
| | 30a/0 | 30b/0 | 30e/180 | 30f/180 | |
| ARRANGEMENT POINT/ ANGLE/ ANGULAR VARIATION | 22a/0/0 | 22b/345/15 | 22c/315/135 | 22d/270/90 | 2 |
| | 22a/0/0 | 22b/345/15 | 22c/315/135 | 22e/195/15 | 3 |
| | 22a/0/0 | 22b/345/15 | 22c/315/135 | 22f/180/0 | 3 |
| | 22a/0/0 | 22b/345/15 | 22f/180/0 | 22g/180/0 | 4 |
| | 22c/315/45 | 22d/270/90 | 22e/195/15 | 22g/180/0 | 3 |
| | 22c/315/45 | 22d/270/90 | 22f/180/0 | 22g/180/0 | 3 |
| | 22c/315/45 | 22e/195/150 | 22f/180/0 | 22g/180/0 | 3 |
| | 22d/270/90 | 22e/195/150 | 22f/180/0 | 22g/180/0 | 2 |

| PATH | MINIMUM VALUE OF TOTAL ANGULAR VARIATION (DEGREE) | SELECTED ARRANGEMENT POINT |
|---|---|---|
| P1 | 15 | 22a,22b,22f,22g |
| P2 | 360 | |
| P3 | 90 | |
| P4 | 60 | |
| P5 | 0 | |
| P6 | 270 | |

| PATH | UNALLOCATED LENGTH | END POINT LENGTH | TOTAL BALANCE EVALUATION |
|---|---|---|---|
| P1 | 200 | 0 | 200 |
| P4 | 150 | 100 | 250 |
| P5 | 380 | 240 | 620 |

LAYOUT ELEMENT ARRANGING DEVICE, LAYOUT ELEMENT ARRANGING METHOD, LAYOUT ELEMENT ARRANGING PROGRAM, COMPUTER READABLE RECORDING MEDIUM, AND ELECTRONIC APPARATUS

BACKGROUND

Exemplary embodiments of the present invention relate to a layout element arranging device for arranging layout elements having directions such as characters, illustrations, still images and moving images, a layout element arranging method for the layout element arranging device, a layout element arranging program which makes a computer perform a process of the layout element arranging method, a computer readable recording medium having recorded therein the layout element arranging program, and an electronic apparatus.

FIG. 16 shows a layout element arranging method of the related art, and FIG. 17 shows a path direction used for arranging the layout elements. To facilitate the explanation and understanding of the layout element arranging method of the related art, it is assumed that four successive motion images 101a, 101b, 101c, and 101d are arranged in a space 100 such as a computer display and a print paper for printers, as shown in FIG. 16. The images 101a to 101d represent a short-distance race one after another, and indicate 'START', 'TUMBLE', 'RECOVER' and 'GOAL', respectively. In addition, the images 101a to 101d are specified by the above motions or have estimated moving directions, respectively. For example, the image 101a representing a player that starts to move toward the right side has a 'RIGHT' direction and the image 101c representing a player that continuously moves toward the left side has a 'LEFT' direction.

In the layout element arranging method of the related art, a path 201 is used as shown in FIG. 17. Here, the path includes seven arranging points 202a to 202g that exist in a space 200 corresponding to the space 100 shown in FIG. 16. The arrangement point described herein is a relay point (pass point) or an end point constituting a path. The path 201 has one direction for improving a feeling of being, liveliness and truthfulness to be reproduced by a plurality of successive layout elements totally and sequentially, and more specifically, has a reverse-N shaped direction. In addition, each of the arrangement points 202a to 202g has a direction, and more specifically, has a direction of tangential line at each point of the end points and the relay points of the path 201. For example, the arrangement point 202a has a 'DOWN' direction and the arrangement point 202f also has a 'DOWN' direction.

In the layout element arranging method of the related art, four images 101a to 101d are arranged in the space 100 along the path direction 201, as shown in FIGS. 16 and 17. More specifically, the image 101a is arranged at the arrangement point 202a, the image 101b is arranged at the arrangement point 202b, the image 101c is arranged at the arrangement point 202f, and the image 101d is arranged at the arrangement point 202g.

SUMMARY

However, according to the layout element arranging method of the related art, the directions of the images 101a, 101b, 101c and 10d and the directions of the arrangement points 202a, 202b, 202f and 202g where the images are arranged may not be matched. For example, the direction of the image 101a may be 'RIGHT' while the direction of the arrangement point 202a where the image 101a is arranged is 'DOWN'. Also, the direction of the image 101c may be 'LEFT' while the direction of the arrangement point 202f where the image 101c is arranged is 'DOWN'. As a result, there occurs a problem in that the feeling of being, liveliness and truthfulness that should be shown when four successive images 101a to 101b are rightly arranged cannot be fully obtained.

According to an exemplary embodiment of the present invention, there is provided a layout element arranging device and method for arranging N layout elements (where N is a positive integer), which have information concerning directions and which are to be sequentially arranged, on L paths (where L is a positive integer) having M arrangement points (where M is a positive integer different for each path and specific to each path), each of which, in turn, has information concerning directions. The layout element arranging device includes a first selection for selecting N arrangement points from the M arrangement points of each of the L paths, based on the information concerning the directions of the N layout elements and the information concerning the directions of the M arrangement points for each of the L paths, and a second selection for selecting K paths (where K is a positive integer from 1 to L) from the L paths, based on the information concerning directions of the N layout elements and the information concerning the directions of the N arrangement points selected by the first selection for each of the L paths.

According to the layout element arranging device and arranging method according to the exemplary embodiment described above, a first selection is performed such that N arrangement points are selected from the M arrangement points of each of the L paths based on the information concerning the directions of the N layout elements and the information concerning the directions of the M arrangement points for each of the L paths, and a second selection is performed such that K paths (where K is a positive integer from 1 to L) are selected from the L paths based on the information concerning directions of the N layout elements and the information concerning the directions of the N arrangement points selected by the first selection for each of the L paths. Specifically, the N arrangement points appropriate to the directions of the N layout elements are selected from the M arrangement points constituting each of the L paths. Further, the K paths having appropriate N arrangement points in the directions of the N layout elements are selected from the L paths by comparing with the directions of the N arrangement points in different paths. As a result, the K paths having the arrangement points most suitable for the directions of the N layout elements can be selected.

The layout element arranging device and arranging method according to the exemplary embodiment described above may further include a third selection to select one path from the K paths, based on a relation between the M arrangement points for each of the K paths selected by the second selection and the N arrangement points selected by the first selection for each of the K paths.

According to the layout element arranging device and arranging method according to the exemplary embodiment described above, a third selection is performed such that one path from the K paths is selected based on a relation between the M arrangement points for each of the K paths selected by the second selection and the N arrangement points selected by the first selection for each of the K paths. Specifically, the third selection is performed based on the relation between the M arrangement points and the N arrangement points for each of the K paths. As a result, how much each of the paths can substantially implement its own direction and balance for the N arrangement points can be considered, so that one path most suitable for the directions of the N layout elements can be selected from the K paths.

In the layout element arranging device and arranging method according to the exemplary embodiment described above, the first selection may make a selection based on an angular variation between the directions of the N layout elements and the directions of any of the N number arrangement points for each of the L paths. According to the layout element arranging device and method, the first selection is performed based on the angular variation. As a result, a path having a direction that matches information on the directions of the N layout elements can be readily selected.

In the layout element arranging device and arranging method according to the exemplary embodiment described above, the second selection may make a selection based on the angular variation between the directions of the N layout elements and the directions of the N arrangement points for each of the L paths. According to the layout element arranging device and method, the second selection is performed based on the angular variation. As a result, a path having a direction that matches information on the directions of the N layout elements can be readily selected.

In the layout element arranging device and arranging method according to the exemplary embodiment described above, the second selection may select a path having a relatively low total angular variation. According to the layout element arranging device and method of the exemplary embodiment, a path having a relatively low total angular variation is selected. As a result, a path having a direction that further matches information on the directions of the N layout elements can be readily selected.

In the layout element arranging device and arranging method according to the exemplary embodiment described above, the second selection may select a path having a relatively large number of arrangement points for which the angular variation is a predetermined angle or less. According to the layout element arranging device and arranging method, in the second selection, a path having a relatively large number of the arrangement points in which the total angular variation is a predetermined angle or less is selected. As a result, a path having a direction that further matches the directions of the N layout elements can be readily selected.

In the layout element arranging device and arranging method according to the exemplary embodiment described above, the predetermined angle may be 45 degrees. According to the layout element arranging device and method of the exemplary embodiment, the predetermined angle is 45 degrees where information on the direction of one layout element and information on the direction of one arrangement point are substantially matched. As a result, it can be easily determined whether or not the direction of the one layout element and the direction of the one arrangement point are matched, and thus the matching can be accurately obtained.

In the layout element arranging device and arranging method according to the exemplary embodiment described above, the third selection may makes the selection for each of K paths selected by the second selection, based on any of the following: a first length between two adjacent arrangement points of the N arrangement points selected by the first selection, a second length between one of the first arrangement points from the N arrangement points and one of the second arrangement points from (M-N) arrangement points other than the M arrangement points, a third length between two adjacent arrangement points from the (M-N) arrangement points, and a fourth length between the N arrangement points and other arrangement points serving as end points that specify directions of the respective paths from the (M-N) arrangement points. According to the layout element arranging device and method of the exemplary embodiment, the third selection is performed based on any one of the first, second, third, and fourth lengths. Specifically, the third selection is performed based on the distribution state of the M arrangement points. As a result, the positional balance of the layout element can be made well using the arrangement point on the path.

In the layout element arranging device and arranging method according to the exemplary embodiment described above, the third selection may apply weights on at least one of the first, second length, third, and fourth lengths. According to the layout element arranging device of the exemplary embodiment, the third selection is performed by applying weights on at least one of the first, second length, third, and fourth lengths. As a result, the positional balance of the layout element can be made well using the arrangement point on the path.

In the layout element arranging device and arranging method according to the exemplary embodiment described above, the third selection may set the weight of the fourth length larger than those of the first, second, and third lengths. According to the layout element arranging device, the third selection is performed to set a larger weight on the fourth length than those of the first, second, and third lengths. As a result, the positional balance of the layout element can be made well using the arrangement point on the path.

According to another aspect of the exemplary embodiment, there is provided a layout element arranging program which makes a computer including a first selection circuit and a. second selection circuit perform arrangement of N layout elements (where N is a positive integer), which have information concerning directions and which are to be sequentially arranged, on L paths (where L is a positive integer) having M arrangement points (where M is a positive integer different for each path and specific to each path), each of which, in turn, has information concerning directions. The layout element arranging program includes: a first selection program for making the first selection circuit select N arrangement points from the M arrangement points of each of the L paths, based on the information concerning the directions of the N layout elements and the information concerning the directions of the M arrangement points for each of the L paths; and a second selection program for making the second selection circuit select K paths (where K is a positive integer from 1 to L) from the L paths, based on the information concerning directions of the N layout elements and the information concerning the directions of the N arrangement points selected by the first selection circuit for each of the L paths.

In the layout element arranging program according to the exemplary embodiment described above, the computer may have a third selection circuit, and the layout element arranging program may further include a third selection program for making the third selection circuit select one path from the K paths, based on a relation between the M arrangement points for each of the K paths selected by the second selection circuit and the N arrangement points selected by the first selection circuit for each of the K paths.

In the layout element arranging program according to the exemplary embodiment described above, in the third selection program, the third selection circuit is made to perform the selection based on, for each of K paths selected by the second selection circuit, at least one of a first length between two adjacent arrangement points of the N arrangement points selected by the first selection circuit, a second length between one of the first arrangement points from the N arrangement points and the second arrangement point adjacent to the first arrangement point which is one of the second arrangement points from (M-N) arrangement points other than the N arrangement points, a third length between two adjacent arrangement points from the (M-N) arrangement points, and a fourth length between the N arrangement points and other arrangement points serving as end points that specify directions of the respective K paths from the (M-N) arrangement points.

According to a second exemplary embodiment of the present invention, there is provided a computer readable recording medium having recorded therein a layout element arrangement program according to the exemplary embodiment described above.

According to a third exemplary embodiment of the present invention, there is provided an electronic apparatus for arranging N layout elements (where N is a positive integer), which have information concerning directions and which are to be sequentially arranged, on L paths (where L is a positive integer) having M arrangement points (where M is a positive integer different for each path and specific to each path), each of which, in turn, has information concerning directions. The electronic apparatus includes: a first selection circuit to select N arrangement points from the M arrangement points of each of the L paths, based on the information concerning the directions of the N layout elements and the information concerning the directions of the M arrangement points for each of the L paths; and a second selection circuit to select K paths (where K is a positive integer from 1 to L) from the L paths, based on information concerning directions of the N layout elements and the information concerning the directions of the N arrangement points selected by the first selection circuit for each of the L paths.

The electronic apparatus according to the third exemplary embodiment described above may further include a storage unit for storing the L paths.

The electronic apparatus according to the third exemplary embodiment described above may further include an input unit to input the N layout elements; and a display unit to display the N layout elements.

The electronic apparatus according to the third exemplary embodiment described above may further include a third selection circuit to select one path from the K paths, based on a relation between the M arrangement points for each of the K paths selected by the second selection circuit and the N arrangement points selected by the first selection circuit for each of the K paths.

The electronic apparatus according to the third exemplary embodiment described above may further include a display unit to display one path selected by the third selection circuit.

In the electronic apparatus according to the third exemplary embodiment described above, the display unit may display the N layout elements.

In the electronic apparatus according to the third exemplary embodiment described above, the display unit may display positions of the arrangement points where the N layout elements are not allocated, from arrangement points of the one path.

BRIEF DESCRIPTION OF THE DRAWINGS

FIG. 1A is a schematic of a layout element arranging device according to an exemplary embodiment of the present invention;

FIG. 1B is a schematic conceptually showing a layout element arranging device according to an exemplary embodiment of the present invention;

FIG. 7 is a schematic showing a selection of direction of the image according to an exemplary embodiment of the present invention;

FIG. 9 is a schematic showing a total of angular variation for the configuration of the images and the arrangement points according to an exemplary embodiment of the present invention;

FIG. 10 is a schematic showing a maximum angular variation for the configuration of the images and the arrangement points according to an exemplary embodiment of the present invention;

FIG. 11 is a schematic showing the number of images that has an angular variation of 45 degrees or less for the configuration of the images and the arrangement points according to an exemplary embodiment of the present invention;

DETAILED DESCRIPTION OF EMBODIMENTS

Exemplary embodiments of the present invention will now be described with reference to the drawings.

Figure 2:
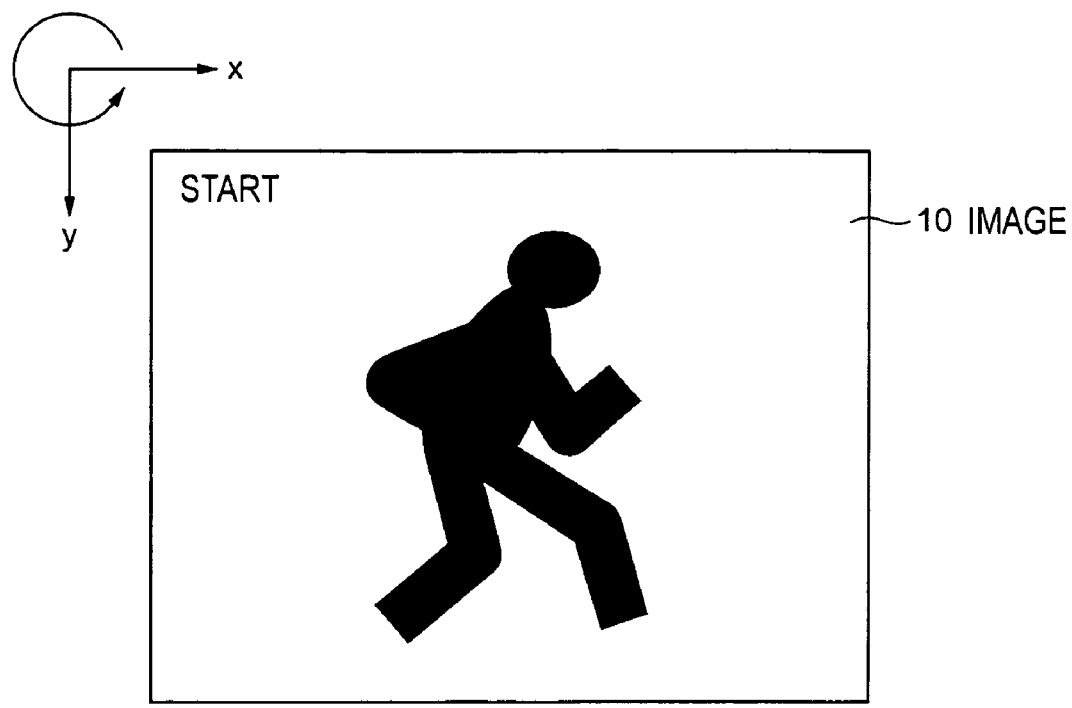
FIG. 2 is a schematic showing an image according to an exemplary embodiment of the present invention.
Figure 3:
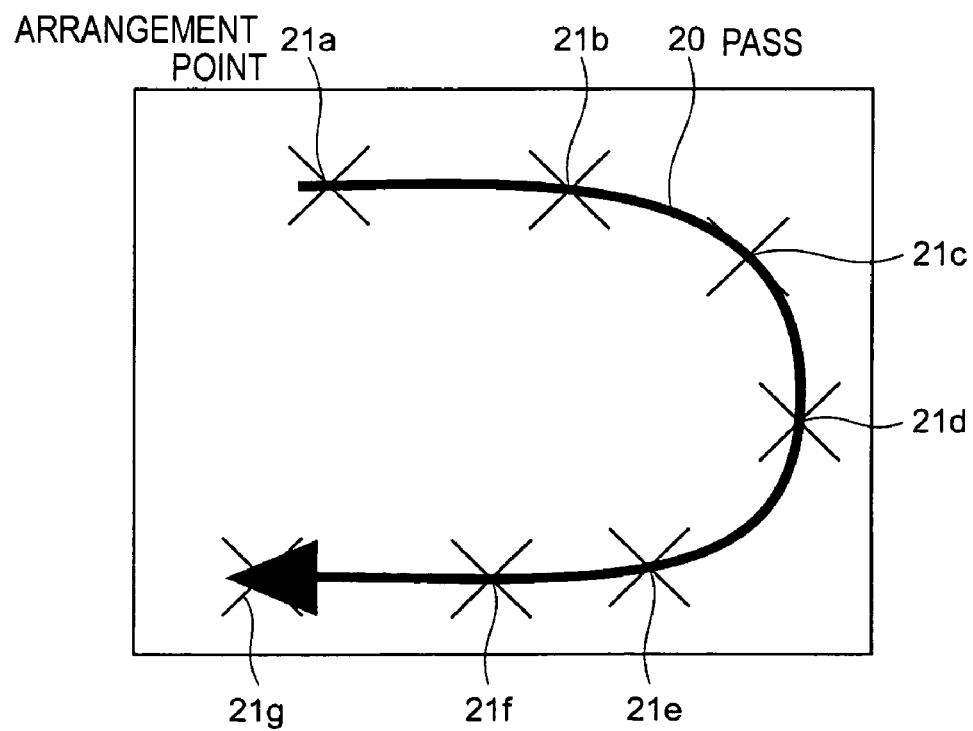
FIG. 3 is a schematic showing a path according to an exemplary embodiment of the present invention.

FIGS. 1A and 1B show a configuration of a layout element arranging device according to an exemplary embodiment of the present invention. A layout element arranging device 1 of the exemplary embodiment of the present invention (hereinafter, referred to as a 'device 1') is provided in electronic apparatuses ED such as personal computers, PDAs (Personal Digital Assistance), KIOSK terminals, printers (multi functions), media servers, photo viewers, digital cameras. The layout element arranging device 1 arranges a plurality of images starting with images 10 shown in FIG. 2, i.e., a plurality of layout elements one after another along a path including M arrangement points 21a to 21g (where M is a positive integer different for each path and specific to each bus, here, M=7) as shown in FIG. 3. The layout element arranging device 1 includes an image input unit 2, an image display unit 3, a control unit 4, an image selection unit 5, an image direction acquisition unit, a path selection unit 7, a path storage unit 8 and a recording medium 9, as shown in FIG. 1. In the following description, a coordinate (X, Y) designates rightward as a positive in X and downward as a positive in Y, as shown in FIG. 2. In addition, the directions of an image and an arrangement point are represented counterclockwise starting with the positive direction of X (number 0), with a cross point of the X-axis and the Y-axis shown in FIG. 2 as a center.

The image input unit 2, such as a scanner or a digital camera, is used for a user of the device 1 to input the image 10 as shown in FIG. 2.

The image display unit 3, which is, for example, a CRT (Cathode Ray Tube) and a liquid crystal monitor, displays a content of the image such as the image 10 and a state of a plurality of image arrangement.

The control unit 4 includes a logic unit and an operational unit to start a computer, i.e., a CPU (central processing unit), controlling the overall operation of device 1.

The image selection unit 5, which is, for example, a keyboard and a mouse, is used to input instructions for selection when a user needs to select the image.

The image direction acquisition unit 6, which includes, for example, the CPU, acquires the direction of the image selected by the image selection unit 5.

The path selection unit 7, which corresponds to the first, second, and third selection circuits to perform the first, second, and third processes and includes, for example, the CPU as in the image direction acquisition unit 6, selects the path advantageous or optimal to the image based on the direction of the image acquired by the acquired direction acquisition unit 6 and the direction of the arrangement point of a plurality of paths stored in the path storage unit 8.

The path storage unit 8 stores information on the L paths (where L is a positive integer) starting with the path 20 shown in FIG. 3.

The recording medium 9 is, for example, a detachable unit such as a flexible disk or a CD-ROM in relation to an interface (I/F) 50, a ROM or RAM 52 described below, and the computer having a functional unit such as the control unit 4, the image direction acquisition unit 6, and the path selection unit 7 records the program (processes S10 to S16 described below) that executes a processing of the functional unit.

Figure 4:
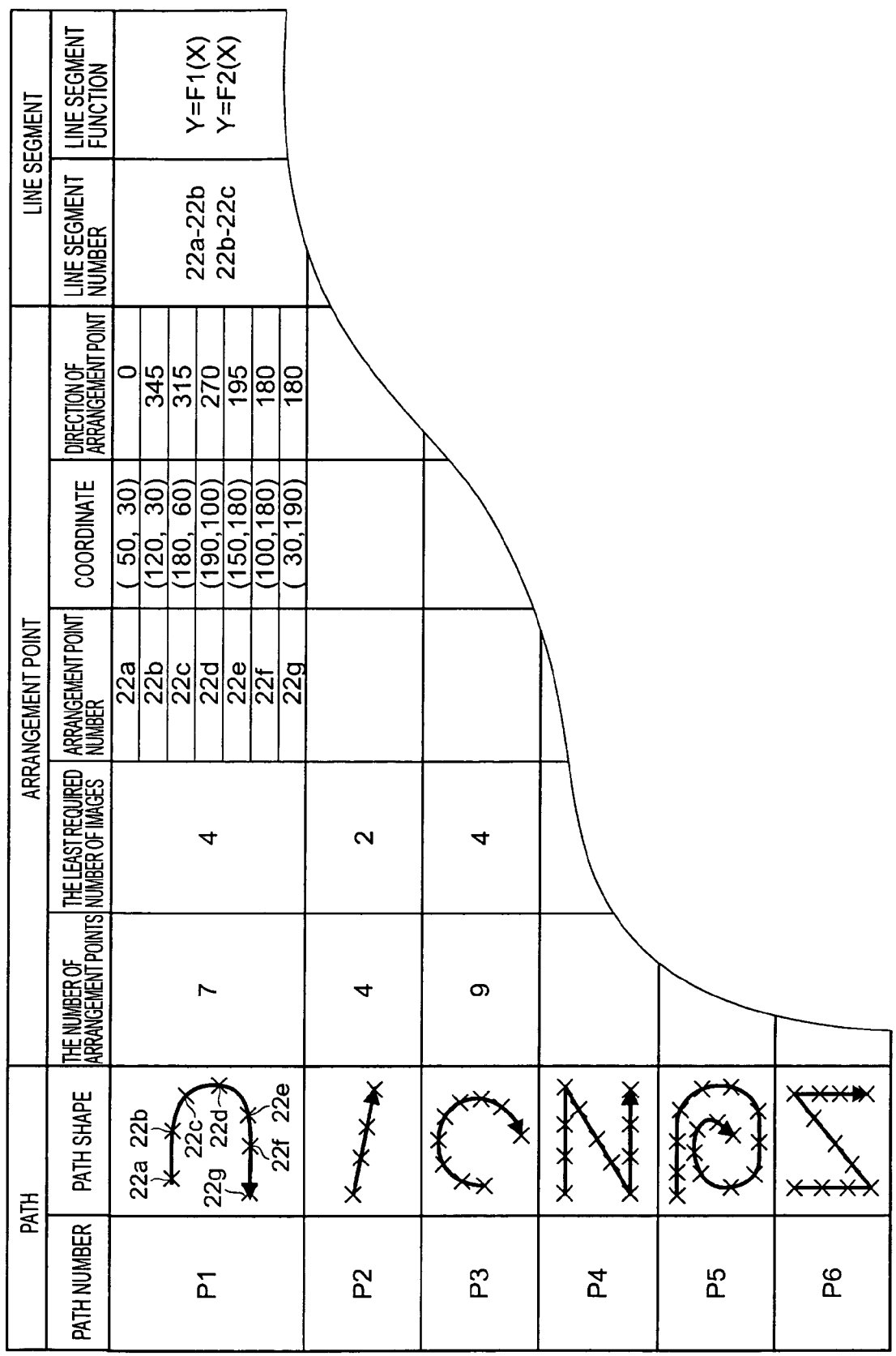
FIG. 4 is a schematic showing information on the path stored into a path storage unit according to an exemplary embodiment of the present invention.

FIG. 4 shows information the path stored into the path storage unit. The path storage unit 8 stores, for L paths (in the example, L=6), a path number, a path shape, the number of arrangement points, the least required number of images, and an arrangement point number, a coordinate, a direction of the arrangement point, a line segment number, and a line segment function, as shown in FIG. 4. Here, the 'PATH NUMBER' is a serial number of the path, the 'PATH SHAPE' is the shape of the path itself, 'THE NUMBER OF ARRANGEMENT PATHS' is the number of arrangement points constituting the path, the 'LEAST REQUIRED NUMBER OF PATH' is the least required number of path when the path is used, the 'ARRANGEMENT POINT NUMBER', 'COORDINATE', AND 'DIRECTION OF ARRANGEMENT POINT' refers to the serial number, a coordinate, and a direction of the arrangement point, 'LINE SEGMENT' is a serial number of the line segment between two adjacent arrangement points, and the 'LINE SEGMENT FUNCTION' is a function representing the line segment.

Specifically, the path storage unit 8 stores information on 6 paths, such as the path number 'P1' to 'P6'. Therefore, for example, for the path P1 having the path number 'P1', the path shape 'U', and the arrangement points 22a to 22g, the number of the arrangement point of '7', the least required number of images of '5', the arrangement point number of '22a' and the coordinate and the direction of the arrangement point (50, 30), 0, and the function of the line segment '22a to 22b', which is a line segment between the arrangement point 22a and 22b, having Y=F1(X) are stored. In the same manner, the path storage unit 8 stores the arrangement point number '22b' of the path P1 with the coordinate and the direction of (120, 30) and 345 degrees, the arrangement point number '22c' of the path P1 with the coordinate and the direction of (180, 60) and 315 degrees, and the arrangement point number '22d' of the path P1 with the coordinate and the direction of (190, 100) and 270 degrees, and so on.

As conceptually shown in FIG. 1B, in the device 1 of an exemplary embodiment of the present invention, the image input unit 2, the image display unit 3, the image selection unit 5 and the path selection unit 7 include the interface (I/F) 50, and the control unit 4 and the image direction acquisition unit 6 includes a CPU 51, and the recording medium 9 and the path storage unit 8 includes a ROM or a RAM 52.

<Operation>

Figure 5:
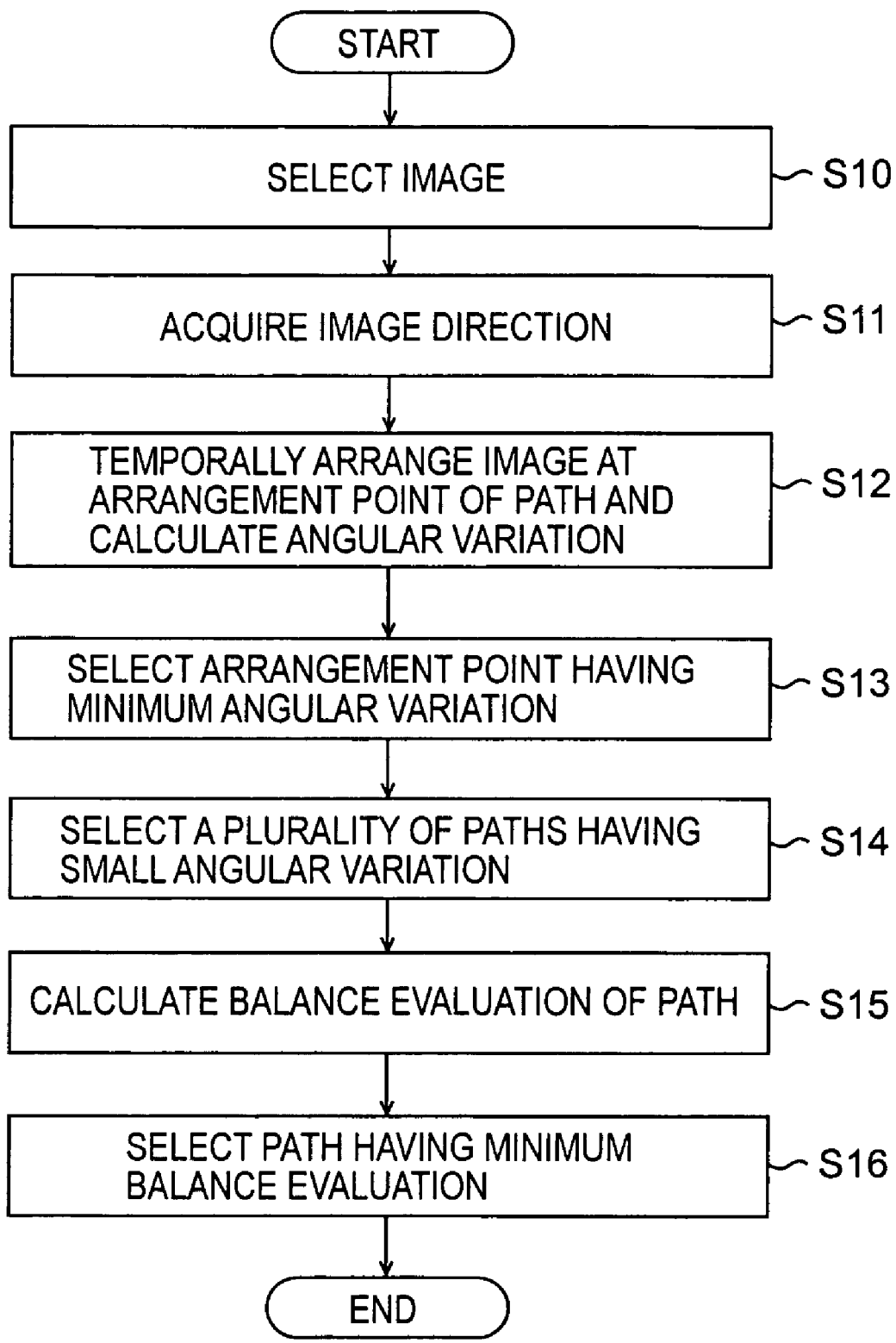
FIG. 5 is a flowchart showing an operation of the device according to an exemplary embodiment of the present invention.

FIG. 5 illustrates an operation of the device according to an exemplary embodiment of the present invention. Hereinafter, the operation of the device 1 of the exemplary embodiment will now be described with reference to FIG. 5.

Figure 6:
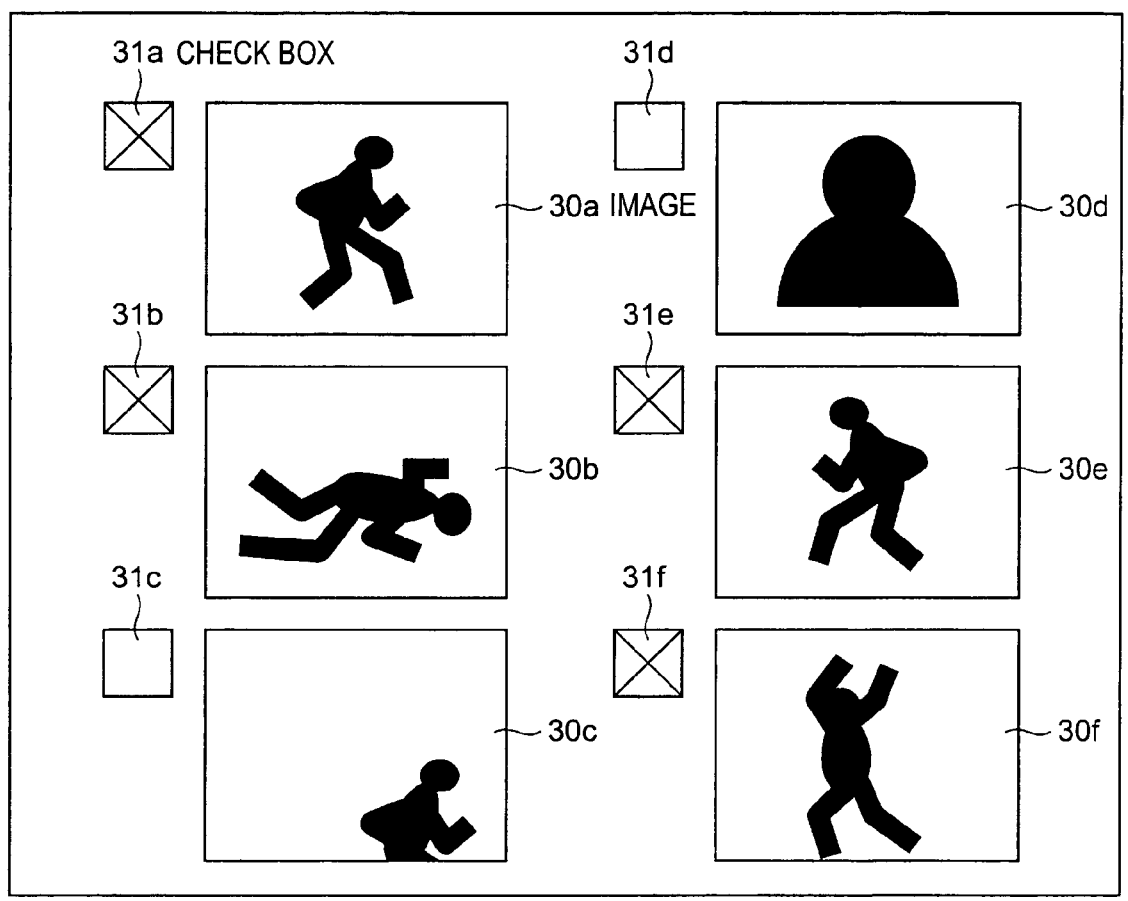
FIG. 6 is a schematic showing a selection of the device according to an exemplary embodiment of the present invention.

Step S10: as shown in FIG. 6, the image display unit 3 displays six images 30a to 320f already inputted along with check boxes 31a to 31f for selection, and in response to the display, the user of the device 1 selects N images 30a, 30b, 30e and 30f (where N is a positive integer, and in this example, N=4) that the user likes by selecting the check boxes 31a, 31b, 31e and 31f in the image selection unit 5. Here, the image 30a represents 'START', the image 30b represents 'TUMBLE', the image 30e represents 'RECOVER' and the image 30f represents 'GOAL'.

Step S11: when the images 30a, 30b, 30e and 30f are selected, the image direction acquisition unit 6 acquires the image directions (one direction as well as no direction and multiple directions). For example, the image direction acquisition unit 6 acquires the direction of the image 30a as 'RIGHT', i.e., 0 degree, and the direction of the image 30e as 'LEFT', i.e., 180 degrees, as shown in FIG. 7.

Here, the image direction acquisition unit 6 uses a method of specifying the direction of the image with the temporal and relative positional relation, for example, between the moving object (human running) and the static background, a method of detecting the direction of the image with optical flow, and a method of determining the direction of the image based on the characteristic or attribute of the moving object or the static object in itself (e.g., direction of the face or the direction of the acute angle in a triangle). Instead of acquiring the direction of the image, the image direction acquisition unit 6 may determine the direction of the image such that the user input the directions of the images 30a, 30b, 30e and 30f by using the image selection unit 5.

Figure 8:
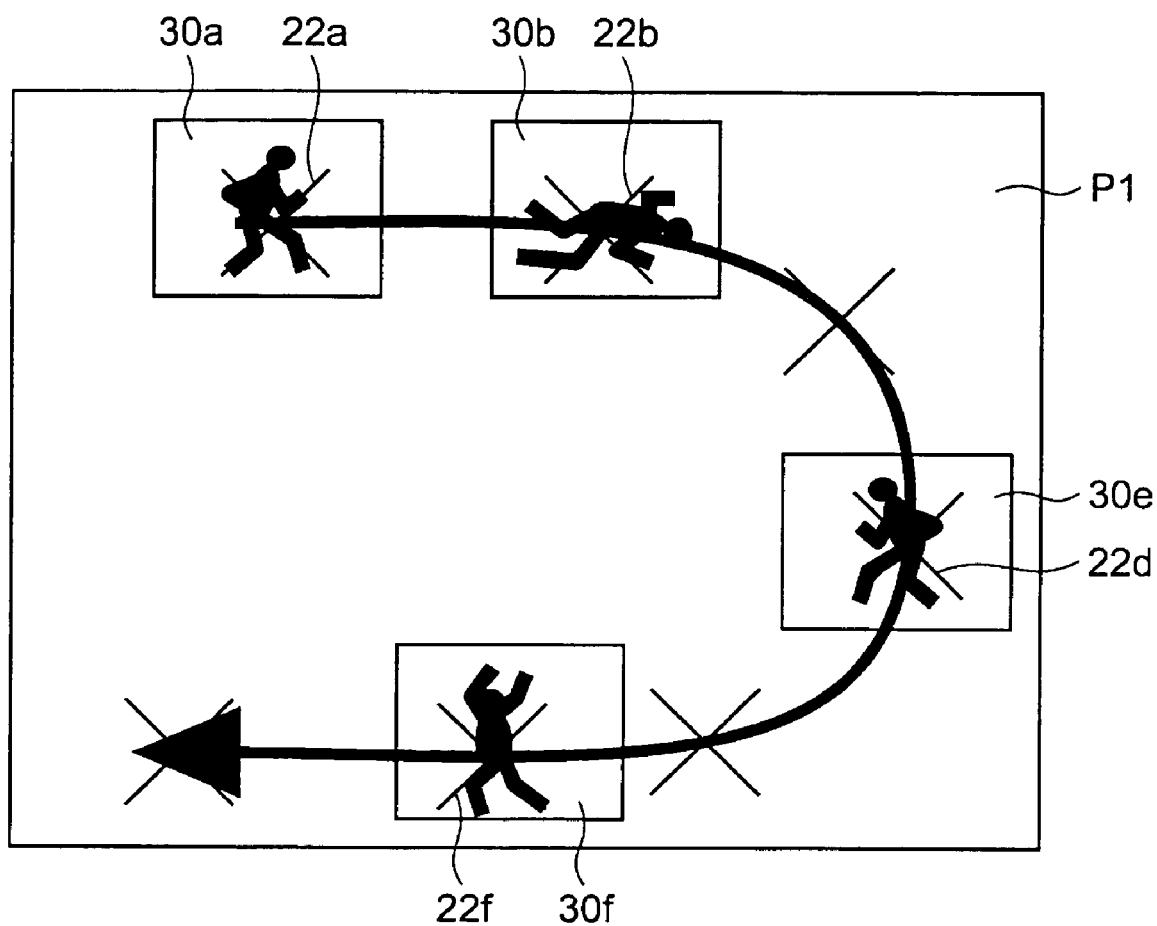
FIG. 8 is a schematic showing a temporal arrangement of the image according to an exemplary embodiment of the present invention.

Step S12: the path selection unit 7 temporally arranges the four images 30a, 30b, 30e and 30f shown in FIG. 7 at any of four arrangement points of the path P1 shown in FIG. 4. More specifically, for example, the path selection unit 7 temporally arranges the images 30a, 30b, 30e and 30f in the described sequence at the arrangement points 22a, 22b, 22d and 22f from 7 arrangement points 22a to 22g on the path P1, as shown in FIG. 8.

In addition, the path selection unit 7 calculates the angular variation between the directions of the temporally arranged four arrangement points and the directions of the images 30a, 30b, 30e and 30f, whenever the four images 30a, 30b, 30e and 30f are temporally arranged at any of the four arrangement points on the path P1. More specifically, for example, for the images 30a, 30b, 30e and 30f shown in FIG. 8 and the arrangement points 22a, 22b, 22d and 22f on the path P1, the path selection unit 7 calculates the angular variation between the direction of the image 30a and the direction of the arrangement point 22a, the angular variation between the direction of the image 30b and the direction of the arrangement point 22b, the angular variation between the direction of the image 30e and the direction of the arrangement point 22d, and the angular variation between the direction of the image 30f and the direction of the arrangement point 22f.

After temporally arranging the four images 30a, 30b, 30e and 30f at any of four arrangement points on the path P1, the path selection unit 7 repeats the calculation of the angular variation. As a result, the total angular variation between the four images and any of the four arrangement points is determined for the path P1, as shown in FIG. 9.

For example, when the four images 30a, 30b, 30e and 30f and the arrangement points 22a, 22b, 22c and 22d are temporally arranged as shown in the uppermost field of FIG. 9, the path selection unit 7 calculates the angular variation of 0 degree between the direction of the image 30a, i.e., angle of 0 degree, and the direction of the arrangement point 22a, i.e., angle of 0 degree. In the same manner, the path selection unit 7 calculates the angular variation of 15 degrees between the direction of the image 30b, i.e., angle of 0 degree, and the direction of the arrangement point 22b, i.e., angle of 345 degrees, the angular variation of 135 degrees between the direction of the image 30e, i.e., angle of 180 degrees, and the direction of the arrangement point 22c, i.e., angle of 315 degrees, and the angular variation of 90 degrees between the direction of the image 30f, i.e., angle of 180 degrees, and the direction of the arrangement point 22d, i.e., angle of 270 degrees. The path selection unit 7 sums the four angular variations of 0 degree, 15 degrees, 135 degrees and 90 degrees. As a result, the total angular variation of 240 degrees can be acquired between the four images 30a, 30b, 30e and 30f and any of the four arrangement points 22a, 22b, 22c and 22d.

Here, when the image 30a has no direction, the path selection unit 7 acknowledges that the image 30a can be arranged at any of the arrangement points 22a to 22d, regardless of the calculation of the angle variation in the temporal arrangement. In addition, when the image 30a has multiple directions, the path selection unit 7 calculates the angular variation between the direction of the image 30a and the direction of the arrangement point 22a as an angular variation between one of the multiple directions of the image 30a and the direction of the arrangement point 22a.

Step S13: the path selection unit 7 selects four arrangement points of which combination has the least total angular variation from the combinations between the four images and the four arrangement points shown in FIG. 9. Here, when the images 30a, 30b, 30e and 30f are temporally arranged at the arrangement points 22a, 22b, 22f and 22g, the total angular variation is the minimum, i.e., 15 degrees, as is apparent in FIG. 9. As a result, the path selection unit 7 selects the arrangement points 22a, 22b, 22f and 22g as the arrangement points appropriate to the images 30a, 30b, 30e and 30f, from the arrangement points 22a to 22g on the path P1.

The path selection unit 7 completes the calculation of the total angular variation between the four images 30a, 30b, 30e and 30f and any of four arrangement points of the arrangement points 22a to 22g, for the path P1 as shown in FIG. 9, and then selects the arrangement points 22a, 22b, 22f and 22g, which have the least total angular variations. Next, for the paths P2 to P6 shown in FIG. 4, the path selection unit 7 calculates the total angular variation between the images 30a, 30b, 30e and 30f and any of four arrangement points of the arrangement points on the respective paths P2 to P6, similar to those shown in FIG. 9, to select the arrangement points having the least total angular variation. Therefore, as shown in FIG. 10, the relation between the least total angular variation and the four arrangement points is also determined for the paths P1 to P6.

In the step S13, the path selection unit 7 calculates the total angular variation between the four images 30a, 30b, 30e and 30f and four arrangement points of the arrangement points 22a to 22g as shown in FIG. 9, and then, instead of selecting the arrangement points 22a, 22b, 22f and 22g, which have the least total angular variation, determines the maximum angular variation (e.g., 135) from the angular variations (e.g., 0, 15, 135, 90) between the four images 30a, 30b, 30e and 30f and four arrangement points (e.g., 22a, 22b, 22c and 22d) of the arrangement points 22a to 22g, for every four arrangement points from the arrangement points 22a to 22g (e.g., 135, 135, 135, ..., 15, ..., 90, 90, 150, 150) to select the least angular variation from the maximum angular variation, as shown in FIG. 10. In addition, as shown in FIG. 11, the path selection unit 7 may count the number of the angular variation of 45 degrees or less (e.g., 2) from the angular variations (e.g., 0, 15, 135, 90) between the four images 30a, 30b, 30e and 30f for every four arrangement points (e.g., arrangement points 22a, 22b, 22c and 22d) of the arrangement points 22a to 22g (for example, 2, 3, 3, ..., 4, ..., 3, 3, 3, 2) to select the arrangement points 22a, 22b, 22f and 22g, which have the maximum number (i.e., 4) of arrangement points from the number of the arrangement points.

Figures 12, 13:
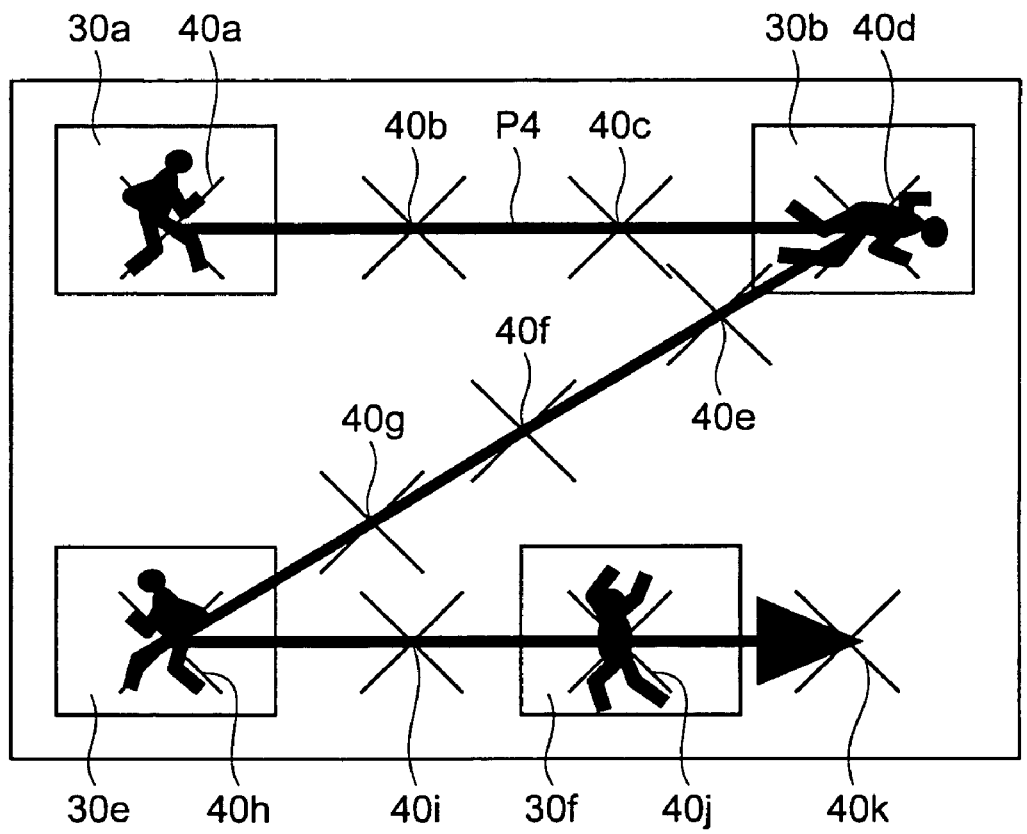
FIG. 12 is a schematic showing a relation between the path, the minimum angular variation and the selected arrange point according to an exemplary embodiment of the present invention.
FIG. 13 is a schematic showing an unallocated length and an end point length according to an exemplary embodiment of the present invention.

Step S14: based on the table shown in FIG. 12, the path selection unit 7 selects the paths P1, P4 and P5 as K paths (where K is a positive integer from 1 to L, and in this example, K=3), which have the relatively low total angular variation.

Step S15: the path selection unit 7 estimates the balance of the paths P1, P4 and P5. Here, a term 'balance' refers to how much the arrangement points allocated to the respective paths of P1, P4 and P5 can fully reproduce the direction and the arrangement of the respective path itself. More specifically, the path selection unit 7 the length (hereinafter, referred to as an unallocated length) between each of the arrangement points not arranged, i.e., not able to be allocated, with the images 30a, 30b, 30e and 30f (hereinafter, referred to as an unallocated arrangement point) and the length (hereinafter, referred to as an end point length) between the arrangement points matched to the images 30a, 30b, 30e and 30f (hereinafter, referred to as an allocated arrangement point) and the arrangement points acting as the end points (starting points or ending points) on the path of the unallocated arrangement points (hereinafter, referred to as an unallocated end point arrangement point) are calculated using the coordinate of the arrangement point or the line segment function shown in FIG. 4, and the above two lengths are summed.

Figures 14, 15:
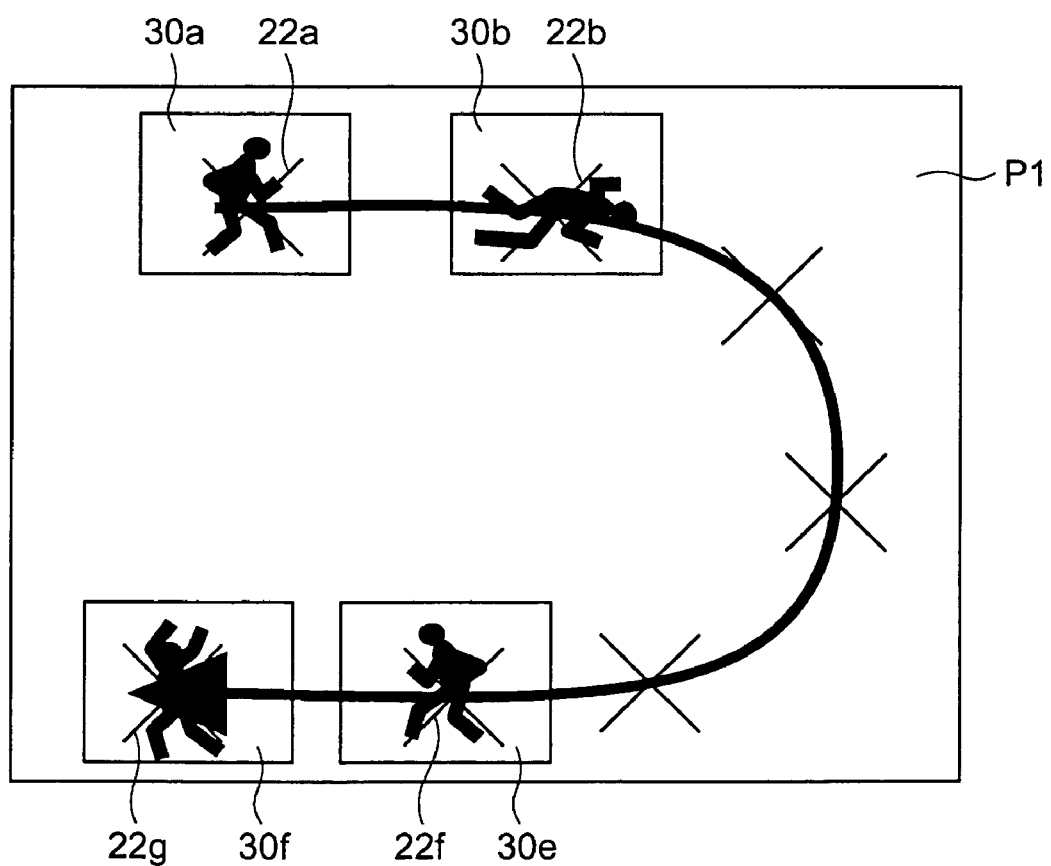
FIG. 14 is a schematic showing a relation between the path, the unallocated length, the end point length and the balance evaluation according to an exemplary embodiment of the present invention.
FIG. 15 is a schematic showing a relation between the arrangement points of the path and the arranged images according to an exemplary embodiment of the present invention.
Figure 16:
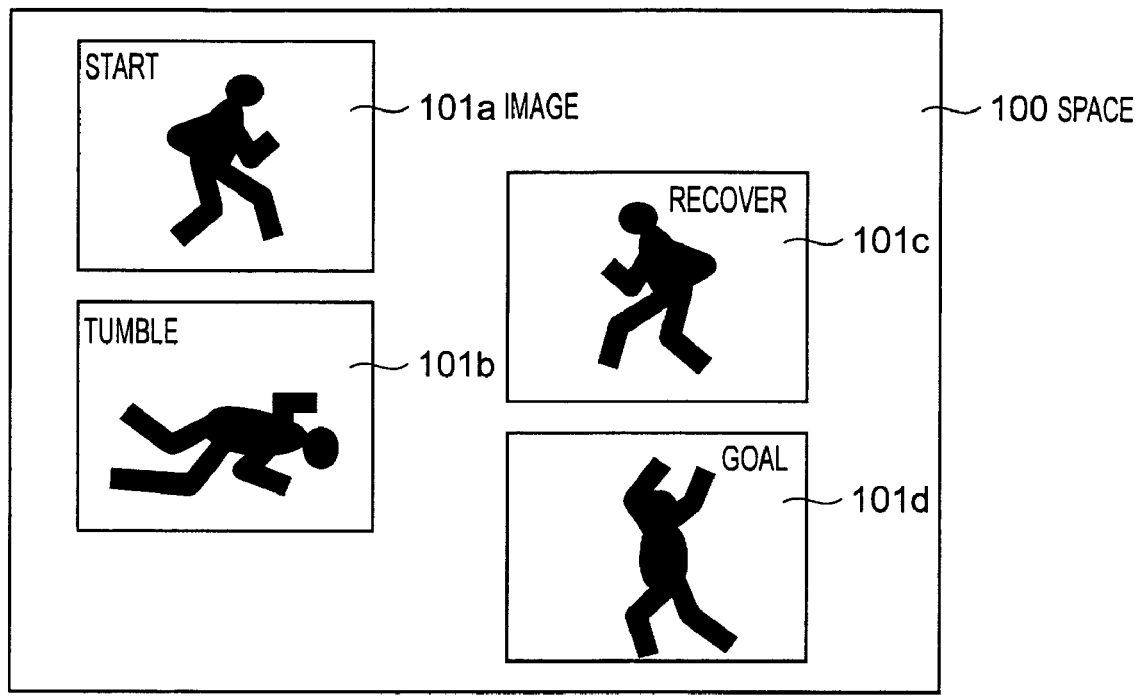
FIG. 16 is a schematic showing a related art layout element arranging method.
Figure 17:
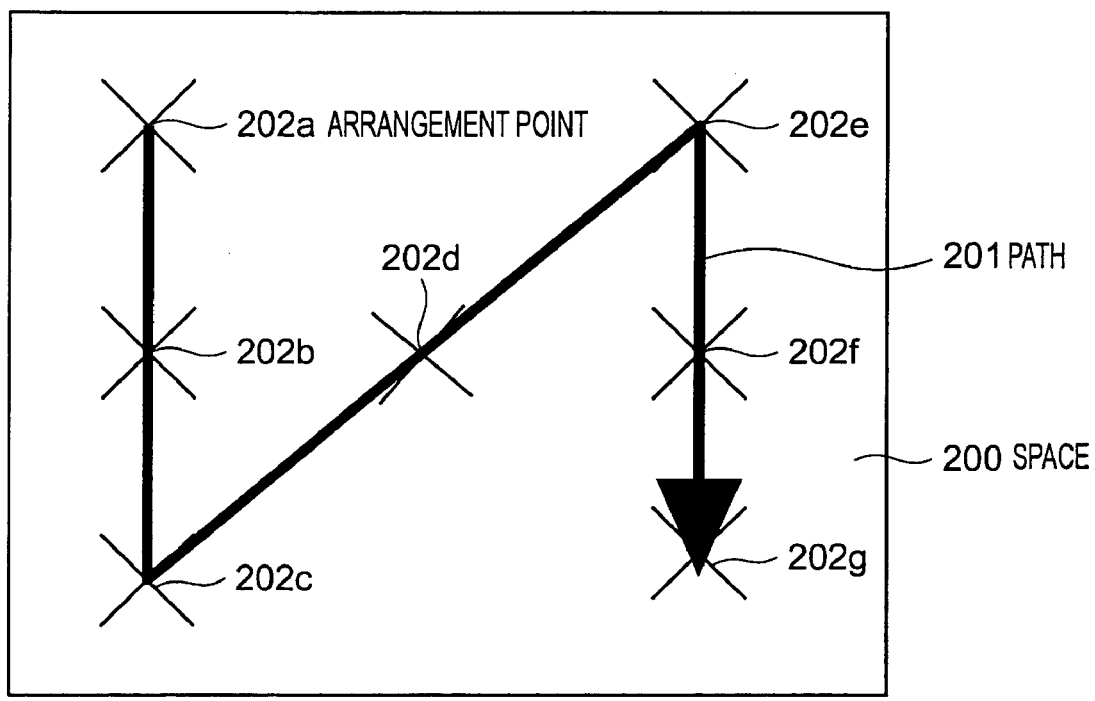
FIG. 17 is a schematic showing a path for a related art layout element arrangement.

More specifically, for example, the path selection unit 7 allocates the image 30a to the arrangement point 40a, the image 30b to the arrangement point 40d, the image 30e to the arrangement point 40h, and the image 30f to the arrangement point 40j to calculate as unallocated lengths for the path P4 the length between the unallocated arrangement point 40b and the unallocated arrangement point 40c, the length between the unallocated arrangement point 40e and the unallocated arrangement point 40f, and the length between the unallocated arrangement point 40f and the unallocated arrangement point 40g, and as an end point length the length between the allocated arrangement point 40j and the unallocated end point arrangement point 40k as shown in FIG. 13. The paths P1 and P5 also undergo the same calculation to determine the relation between the paths P1, P4 and P5 and the balance evaluation of the unallocated length and the end point length, as shown in FIG. 14. Here, the summation of the balance evaluation indicates that fewer paths are further suitable to the allocation of the images.

In addition, the above calculated can be understood in a manner that there is a weight of 0 on the first length between the allocated arrangement points, and the second length between the allocated arranged points and the unallocated arrangement points while there is a weight of 1 on the third length between the unallocated arrangement lengths (unallocated lengths) and the fourth length between the arrangement points and the end points.

Step S16: the path selection unit 7 selects the path P1, which has the minimum total balance evaluation shown in FIG. 14. From this result, it is determined to be advantageous or optimal as an arrangement of the images 30a, 30b, 30e and 30f that the image 30a is allocated to the arrangement point 22a on the path P1, the image 30b is allocated to the arrangement point 22b on the same path P1, the image 30e is allocated to the arrangement point 22f on the same path P1, the image 30f is allocated to the arrangement point 22g on the same path P1, as shown in FIG. 15 (In FIG. 13, x refers to a position of the arrangement points where the image cannot be allocated). As shown in FIG. 13, the image display unit 3 displays the images 30a, 30b, 30e and 30f that can be allocated on the arrangement points 22a, 22b, 22f and 22g on the path P1 selected by the path selection unit 7.

<Exemplary Effect>

As described above, in the device 1 of the exemplary embodiments of the present invention, through the process from the step S10 to step S14, four images 30a, 30b, 30e and 30f are temporally arranged at any of four arrangement points from the arrangement point on the paths P1 to P6, and then the angular variation between the directions of the images 30a, 30b, 30e and 30f and the directions of the temporally arranged arrangement points are calculated. By doing so, four arrangement points of which direction is appropriate to those of the images 30a, 30b, 30e and 30f are selected, as shown in FIG. 9. Next, from the paths PI to P6, the paths P1, P4 and P5 having four arrangement points with the least angular variation between the images 30a, 30b, 30e and 30f and the four selected arrangement points, as shown in FIG. 12. As a result, three paths having the four arrangement points are selected, which are most appropriate to the directions of four directions 30a, 30b, 30e and 30f.

Moreover, in the device 1 of the example of the present invention, through the process from step S15 to step S16, the balance of the allocated arrangement points are evaluated for the paths P1, P4 and P5, as shown in FIG. 14. As a result, the arrangement points that are most appropriate to the allocation of the images 30a, 30b, 30e and 30f can be selected.

<Modification>

In step S14, instead of selecting three paths P1, P4 and P5 having the relatively low angular variations, the paths having the relative large angular variation of a predetermined value (e.g., 45 degrees or less) may be selected to achieve the afore-mentioned effect. Here, it is desired that the angular variation is 45 degrees, since it is assumed that the direction of the images and the direction of the arrangement points are substantially same within 45 degrees.

In the step S15, instead of or in addition to the calculation of the unallocated length and the end point length, which are adjacent with each other, the length between the adjacent allocated arrangement points (hereinafter, referred to as an allocated length) and the length between the adjacent allocated arrangement point and the unallocated arrangement point (hereinafter, referred to as an allocated-unallocated length) may be calculated to obtain the same effect as described above. Furthermore, the unallocated length, the end point length, the allocated length, and the ratio of the allocated to unallocated length, more specifically, the distribution state of the arrangement points constituting the unallocated length, the arrangement points constituting the end point length, the arrangement points constituting the allocated length, the arrangement points constituting the allocate-unallocated length are calculated. Specifically, the distribution state is obtained to cause the arrangement point to be a minimum of [a total of the summation of the third length, which is the unallocated length, and the summation of the fourth length, which is the end point length]/[a total of the summation of the first length, which is the allocated length, and the summation of the second length, which is the allocated-unallocated length]. As a result, the empty space between the arrangement points, which may easily draw attention, can be reduced, minimized or eliminated.

In the step S15, in addition to the calculation of the unallocated length and the end point length as described above, the unallocated length and the end point length can be weighted. Moreover, the afore-mentioned allocated length and the allocated-unallocated length can be weighted to obtain the afore-mentioned effect or more. In particular, with respect to the balance of the arrangement, more weight is applied to the end point length than those of the unallocated length, the allocated length and the allocated-unallocated length, for example, the summation between the weight of '1' for the third length (unallocated length) and the weight of '2' for the fourth length (end point length) is minimized so that the visible empty space can be reduced or eliminated.

What is claimed is:

1. A layout element arranging device for arranging N layout elements (where N is a positive integer) on at least one arrangement path selected from L paths (where L is a positive integer), the layout element arranging device having information concerning a layout element innate characteristic direction for each layout element that is to be sequentially arranged, each L path having M arrangement points (where M is a positive integer different for each path and specific to each path), each arrangement point having information concerning a path direction, the layout element arranging device comprising:

a first selection circuit to select N arrangement points from the M arrangement points of each of the L paths, based on the information concerning the layout element innate characteristic directions of the N layout elements and the information concerning the path directions of the M arrangement points for each of the L paths;

a second selection circuit to select from the L paths, K paths (where K is a positive integer from 1 to L) based on the information concerning layout element innate characteristic directions of the N layout elements and the information concerning the path directions of the N arrangement points selected by the first selection circuit for each of the L paths; and a third selection circuit to select at least one arrangement path from the K paths, based on a relation between the M arrangement points for each of the K paths selected by the second selection circuit and the N arrangement points selected by the first selection circuit for each of the K paths.

2. The layout element arranging device according to claim 1,
the first selection circuit performing the selection based on an angular variation between the layout element innate characteristic directions of the N layout elements and the path directions of any of the N arrangement points for each of the L paths.

3. The layout element arranging device according to claim 1,
the second selection circuit performing the selection based on an angular variation between the layout element innate characteristic directions of the N layout elements and the path directions of the N arrangement points for each of the L paths.

4. The layout element arranging device according to claim 3,
the second selection circuit selecting a path having a relatively low total angular variation.

5. The layout element arranging device according to claim 4,
the second selection circuit selecting a path having a minimum total angular variation.

6. The layout element arranging device according to claim 4,
the second selection circuit selecting paths having total angular variations within a predetermined number, starting with the path having the minimum total angular variation.

7. The layout element arranging device according to claim 3,
the second selection circuit selecting a path having a relatively large number of arrangement points for which the angular variation is a predetermined angle or less.

8. The layout element arranging device according to claim 7,
the second selection circuit selecting a path having a maximum number of arrangement points for which the angular variation is a predetermined angle or less.

9. The layout element arranging device according to claim 7,
the second selection circuit selecting paths having the number of arrangement points, in which the angular variation is a predetermined angle or less, within a predetermined number, starting with the path having the maximum number of the arrangement points.

10. The layout element arranging device according to claim 7,
the predetermined angle being 45 degrees.

11. The layout element arranging device according to claim 1,
the third selection circuit making the selection of each of the arrangement paths based on any of the following: a first length between two adjacent arrangement points of the N arrangement points selected by the first selection circuit, a second length between one of the first arrangement points from the N arrangement points and the second arrangement point adjacent to the first arrangement which is one of the second arrangement points from (M-N) arrangement points other than the N arrangement points, a third length between two adjacent arrangement points from the (M-N) arrangement points, and a fourth length between the N arrangement points and other arrangement points serving as end points that specify directions of the respective K paths from the (M-N) arrangement points.

12. The layout element arranging device according to claim 11,
the third selection circuit applying weights to at least one of the first, second, third, and fourth lengths.

13. The layout element arranging device according to claim 12,
the third selection circuit setting the weight of the fourth length larger than those of the first, second, and third lengths.

14. A layout element arranging method for arranging N layout elements (where N is a positive integer), on at least one arrangement path selected from L paths (where L is a positive integer), the layout element arranging method involving information concerning a layout element innate characteristic direction for each layout element that is to be sequentially arranged, each L path having M arrangement points (where M is a positive integer specific to each path), each arrangement point having information concerning a path direction, the layout element arranging method comprising:
first selecting N arrangement points from the M arrangement points of each of the L paths, based on the information concerning the layout element innate characteristic directions of the N layout elements and information on the path directions of the M arrangement points for each of the L paths;
second selecting from the L paths, K paths (where K is a positive integer from 1 to L) based on the information concerning layout element innate characteristic directions of the N layout elements and the information concerning the path directions of the N arrangement points selected by the first selecting for each of the L paths; and
third selecting at least one arrangement path from the K paths, based on a relation between the M arrangement points for each of the K paths selected by the second selecting and the N arrangement points selected by the first selecting for each of the K paths, wherein the first selecting, the second selecting and the third selecting is performed by a processor.

15. The layout element arranging method according to claim 14,
the first selecting including making a selection based on an angular variation between the layout element innate characteristic directions of the N layout elements and the path directions of any of the N arrangement points for each of the L paths.

16. The layout element arranging method according to claim 14,
the second selecting including making a selection based on an angular variation between the layout element innate characteristic directions of the N layout elements and the path directions of the N arrangement points for each of the L paths.

17. The layout element arranging method according to claim 16,
the second selecting including selecting a path having a relatively low total angular variation.

18. The layout element arranging method according to claim 17,
the second selecting including selecting a path having a minimum total angular variation.

19. The layout element arranging method according to claim 17,
the second selecting including selecting paths having total angular variations within a predetermined number, starting with the path having the minimum total angular variation.

20. The layout element arranging method according to claim 16,
the second selecting including selecting a path having a relatively large number of arrangement points for which the angular variation is a predetermined angle or less.

21. The layout element arranging method according to claim 20, the second selecting including selecting a path having a maximum number of arrangement points for which the angular variation is a predetermined angle or less.

22. The layout element arranging method according to claim 20,
the second selecting including selecting paths having the number of arrangement points, in which the angular variation is a predetermined angle or less, within a predetermined number, starting with the path having the maximum number of the arrangement points.

23. The layout element arranging method according to claim 20,
the predetermined angle being 45 degrees.

24. The layout element arranging method according to claim 14,
the third selecting including making the selection of each of the arrangement paths based on any of the following: a first length between the N arrangement points selected by the first selecting, a second length between one of the first arrangement points from the N arrangement points and one of the second arrangement points from (M-N) arrangement points other than the N arrangement points, a third length between two adjacent arrangement points from the (M-N) arrangement points, and a fourth length between the N arrangement points and other arrangement points serving as end points that specify directions of the respective K paths from the (M-N) arrangement points.

25. The layout element arranging method according to claim 24,
the third selecting including weighting at least one of the first, second, third, and fourth lengths.

26. The layout element arranging method according to claim 25,
the third selecting including setting the weight of the fourth length larger than those of the first, second, and third lengths.

27. A computer readable recording medium storing a layout element arranging program, the program including a first selection circuit, a second selection circuit and a third selection circuit that perform arrangement of N layout elements (where N is a positive integer) on at least one arrangement path selected from L (paths) (where L is a positive integer), the layout element arranging program having information concerning a layout element innate characteristic direction for each layout element that is to be sequentially arranged, each L path having M arrangement points (where M is a positive integer different for each path and specific to each path), each arrangement point having information concerning a path direction the layout element arranging program comprising:
a first selection program for making the first selection circuit select N arrangement points from the M arrangement points of each of the L paths, based on the information concerning the layout element innate characteristic directions of the N layout elements and the information concerning the path directions of the M arrangement points for each of the L paths;
a second selection program for making the second selection circuit select from the L paths, K paths (where K is a positive integer from 1 to L) based on the information concerning layout element innate characteristic directions of the N layout elements and the information concerning the path directions of the N arrangement points selected by the first selection circuit for each of the L path; and
a third selection program for making the third selection circuit select at least one arrangement path from the K paths, based on a relation between the M arrangement points for each of the K paths selected by the second selection circuit and the N arrangement points selected by the first selection circuit for each of the K paths.

28. The computer readable recording medium storing the layout element arranging program according to claim 27,
in the third selection program, the third selection circuit is made to perform the selection of each of the arrangement paths based on at least one of a first length between two adjacent arrangement points of the N arrangement points selected by the first selection circuit, a second length between one of the first arrangement points from the N arrangement points and one of the second arrangement points from (M-N) arrangement points other than the N arrangement points, a third length between two adjacent arrangement points from the (M-N) arrangement points, and a fourth length between the N arrangement points and other arrangement points serving as end points that specify directions of the respective K paths from the (M-N) arrangement points.

29. An electronic apparatus for arranging N layout elements (where N is a positive integer), on at least one arrangement path selected from L paths (where L is a positive integer), the electronic apparatus having information concerning a layout element innate characteristic direction for each layout element that is to be sequentially arranged, each L path having M arrangement points (where M is a positive integer different for each path and specific to each path), each arrangement point having information concerning a path direction, the electronic apparatus comprising:
a first selection circuit to select N arrangement points from the M arrangement points of each of the L paths based on the information concerning the layout element innate characteristic directions of the N layout elements and the information concerning the path directions of the M arrangement points for each of the L paths;
a second selection circuit to select from the L paths, K paths (where K is a positive integer from 1 to L) based on the information concerning layout element innate characteristic directions of the N layout elements and the information concerning the path directions of the N arrangement points selected by the first selection circuit for each of the L path; and
a third selection circuit to select at least on arrangement path from the K paths, based on a relationship between the M arrangement points for each of the K paths selected by the second selection circuit and the N arrangement points selected by the first selection circuit for each of the K paths.

30. The electronic apparatus according to claim 29, further comprising:
a storage unit to store the L paths.

31. The electronic apparatus according to claim 29, further comprising:
an input unit to input the N layout elements; and
a display unit to display the N layout elements.

32. The electronic apparatus according claim 29, further comprising:
a display unit to display at least one arrangement path selected by the third selection circuit.

33. The electronic apparatus according to claim 32,
the display unit displaying the N layout elements.

34. The electronic apparatus according to claim 33,
the display unit displaying positions of the arrangement points where the N layout elements are not allocated, from arrangement points of the one arrangement path.

* * * * *